United States Patent
Weisgerber

[15] 3,690,426
[45] Sept. 12, 1972

[54] WHEEL LOCK CONTROL DIFFERENTIAL

[72] Inventor: Thomas W. Weisgerber, Saginaw, Mich.

[73] Assignee: General Motors Corporation, Detroit, Mich.

[22] Filed: Aug. 27, 1971

[21] Appl. No.: 173,504

[52] U.S. Cl. .............. 192/4 A, 74/110.5, 188/181 A, 303/21 CG
[51] Int. Cl. ........................ B60k 29/02, F16d 55/22
[58] Field of Search ...................... 192/4 A; 74/110.5

[56] References Cited

UNITED STATES PATENTS

| 3,439,785 | 4/1969 | Hughson | 192/4 A |
| 3,439,786 | 4/1969 | Schmid | 192/4 A |
| 3,463,277 | 8/1969 | Allori et al. | 192/4 A |

Primary Examiner—Benjamin W. Wyche
Attorney—W. E. Finken

[57] ABSTRACT

A differential unit has ring gears formed on the inner diameters of the side gears, which are connected to inboard discs for vehicle braking. Planetary gears in the ring gears are rotatably mounted on carriers which transmit power to the axle shafts. The planetary gears also mesh with sun gears which are fastened to a modulator pump shaft. The modulator pump housing is a part of the differential pinion gear axle. The pump includes an integral by-pass valve which is normally closed so as to hydraulically lock the pump. The valve is controlled through a wheel sensor and a logic box which may be of the type of wheel lock control currently in production on several automotive vehicles. During normal operation, the differential acts in the same manner as the usual differential. During braking, the brake torque is carried by the pump. When an incipient wheel lock condition is approached, the pump by-pass valve is opened. The pump is no longer hydraulically locked and therefore allows the sun gears to rotate. This also permits the planetary gears, the carrier axle shafts and the wheels connected thereto to rotate. When the valve is again closed, the system returns to the normal driving condition.

9 Claims, 1 Drawing Figure

PATENTED SEP 12 1972
3,690,426
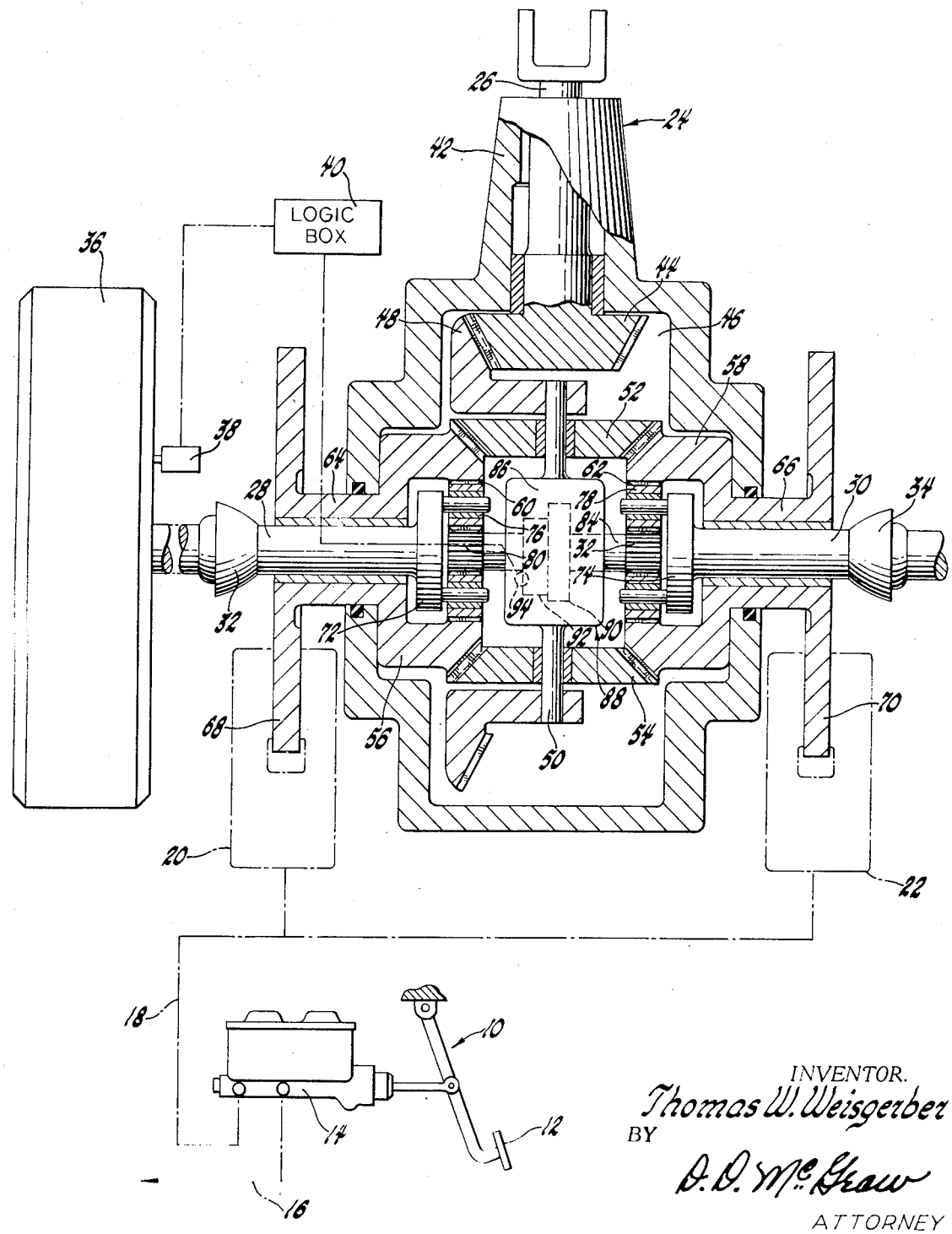
INVENTOR.
Thomas W. Weisgerber
BY
D.D. McGraw
ATTORNEY

WHEEL LOCK CONTROL DIFFERENTIAL

The invention relates to a modulated differential type of wheel lock control utilizing a modification of the usual automotive differential. One of the advantages of the system is that it is automatically operable. It is also integral with the differential and the oil used is the same oil used for differential gear lubrication. It is also an advantage that the entire brake system remains integral and has no hydraulic connection with the wheel lock control.

Under normal driving operations, the unit acts as the usual differential. However, when the brakes are applied so as to cause the wheels connected to the differential to lose speed or decelerate sufficiently to create incipient wheel lock, the system becomes operative. When the wheels accelerate and again reach a condition where wheel lock is no longer incipient, the system is returned to the normal differential operating condition. It may cycle during a braking stop, if necessary, in order to control wheel lock.

IN THE DRAWING:

The single FIGURE is a cross-section view, with parts broken away and some parts illustrated schematically, showing a vehicle differential and brake system with the invention embodied in the differential.

The vehicle in which the system is installed has a braking system 10 which is schematically illustrated as including a pedal 12 actuating a master cylinder 14 to deliver brake actuating pressure to one pair of wheels through conduit 16 and to another pair of wheels through conduit 18. In the preferred embodiment, conduit 18 is connected to the rear wheel brake calipers 20 and 22.

The differential assembly 24 includes a drive shaft 26 connected to be driven by the vehicle engine in a well known manner, and output shafts or axles 28 and 30. These shafts extend in opposite directions and are respectively connected through universal joints 32 and 34 to the vehicle drive wheels, one such wheel 36 being illustrated.

The wheel lock control system includes a wheel condition sensor 38 which generates signals indicating the rotational condition of the wheel. When wheel lock is incipient, the sensor 38 generates and delivers an appropriate signal to the logic box 40 which in turn controls a portion of the system to be described. The sensor 38 and the logic box 40 may be of any suitable type such as that currently manufactured as parts of wheel lock control systems available on several automotive vehicles. The output signal from the logic box is an on-off type signal in its simplest form, although it can be readily seen that under some conditions the system could be refined to have intermediate signals and controls.

The differential assembly 24 includes a housing 42 into which the drive shaft 26 projects. A drive pinion 44 is rotatably driven by the drive shaft and is located in the housing differential chamber 46. The drive pinion 44 engages the ring gear 48, which is mounted on the pinion axle 50 so that the ring gear rotates the pinion axle about the axis of the differential opposed output axles 28 and 30. Pinion axle 50 carries two drive the two side gears gears 52 and 54 which in turn drive 56 and 58. When the vehicle is driven in a straight line there is no relative motion between the two side gears and the two pinion gears do not rotate on their axle. If there is relative motion between the two side gears, such as in a turn, the pinion gears 52 and 54 rotate on the pinion axle 50 and sustain the transmission of power through the gears while allowing the required differential action. Up to this point, the differential is similar in form and function to the standard production-type differential.

The side gears 56 and 58 respectively have ring gears 60 and 62 formed or otherwise provided on their inner diameters. These ring gears are parts of a planetary gear train. The side gears have quill shaft sections 64 and 66 extending outwardly of the housing 42 and about axles 28 and 30 and provided with inboard braking discs 68 and 70. The brake calipers 20 and 22 are positioned to provide friction braking by engagement of brake pads on the braking surfaces of the disc 68 and 70 when the master cylinder 14 is actuated. Other types of braking arrangements can be utilized without departing from the invention.

The inner ends of axles 28 and 30 are respectively connected to planetary gear carriers 72 and 74 and the planetary gear sets 76 and 78 are respectively mounted on these carriers. Planetary gear set 76 meshes with ring gear 60 and planetary gear set 78 meshes with ring gear 62. The planetary gear train also includes sun gears 80 and 82 which respectively mesh with planetary gear sets 76 and 78 and are attached to a through shaft 84.

The pinion axle 50 has a central section forming a modulator pump housing 86 which is a part of the modulator pump assembly 88. The pump includes a positive displacement pump member 90 attached to shaft 84 and located in a sealed pump chamber. The pump housing 86 is suitably ported and formed to provide a by-pass passage 92 connecting the input and output portions of the sealed pump chamber. A control valve 94 is positioned in the passage 92 to control the flow of hydraulic fluid between the pump inlet and the pump outlet. When valve 94 is closed, as it normally is, the pump is hydraulically locked so that the housing 86 and the pump member 90 rotate about the axis of shaft 84 when ring gear 48 is rotated. The pump is at pressure at all times that power is being delivered by the planetary gear train, and in proportion to the amount of power transmitted. However, no power is absorbed and no heat is generated because there is no pump fluid flow. Under this condition of driving operation, the ring gear 48, the pinion axle 50, the pinion gears 54, the side gears 56 and 58 with their shafts 64 and 66 and discs 68 and 70, the pump housing 86, the pump member 90, the through shaft 84, and the sun gears 80 and 82, rotate in unison. Therefore, the planetary gear sets 76 and 78 also rotate in unison with them as do the axles 28 and 30 and, therefore, the vehicle wheels are driven.

Under normal driving conditions, there is no need for the wheel lock control system to function and driving power from the vehicle engine is transmitted through the differential assembly 24 in the normal manner. When sufficient brake line pressure is applied by the master cylinder 14 to the brake calipers 20 and 22 to cause the discs 68 and 70 to be retarded, braking action is effected on the wheel 36 and the similar wheel on the other side. The braking action is effected through the axle-planet carrier-planet gear set-sun gear system.

Brake torque is carried by the pump 88 just as driving torque is carried and in the same rotational direction.

When sufficient brake line pressure is applied to cause the associated vehicle wheels to reduce speed or decelerate in such a manner as to reach incipient wheel lock, the sensor 38 generates and sends an appropriate signal to the logic box 40 indicating this condition. The logic box in turn generates a signal which is sent to the control valve 94. The sensor and logic box functions are well known in the art and any suitable construction and arrangement known in the art may be used. The signal received by the control valve 94 causes that valve to open and allow pump fluid flow through the valve from the pump outlet to the pump inlet through by-pass passage 92. This allows the pump output shaft 84 to rotate and, therefore, allows the sun gears 80 and 82 to rotate relative to the pinion axle 50 and the side gears 56 and 58. This allows rotation of the planetary gear sets 76 and 78 and thus rotation of the planetary carriers 72 and 74. Therefore, the axles 28 and 30 and the wheels connected thereto are permitted to rotate at a faster speed than before, thereby moving away from an incipient wheel lock condition. The sensor 38 then signals the logic box 40 that wheel lock is no longer incipient and the logic box sends a different signal to control valve 94, causing the valve to close. This again hydraulically locks the pump and the rear wheels again slow down if the brakes are still applied. This cycle is repeated during a braking stop so as to generate a controlled stop without wheel locking even though the brakes may be sufficiently applied to otherwise cause one or more wheels to be locked. The system is not required to operate directly or indirectly on the hydraulic braking circuits or other portions of the braking system, thereby maintaining braking circuit integrity and independence. The system may also be applied to other than driving wheels by the appropriate use of differentially connected wheels.

What is claimed is:

1. A vehicle wheel lock control differential comprising:
   a differential input member;
   first and second differential intermediate members;
   first and second differential output members respectively associated with said first and second differential intermediate members and each operatively connected to a vehicle wheel;
   means normally locking said members for concurrent rotation;
   means selectively braking at least one of said intermediate members;
   means operatively sensing incipient lock of at least one of said wheels in response to actuation of said selectively braking means and external conditions affecting said output members and generating an incipient lock signal;
   and means receiving said incipient lock signal and controlling said locking means to unlock same and permit said output members and said wheels to rotate at speeds greater than the speed of rotation of said braked intermediate member.

2. The vehicle wheel lock control differential of claim 1 in which each of said intermediate members includes a differential side gear and a planetary gear set composed of a sun gear and a ring gear on said side gear and a planetary carrier drivingly connected with one of said output members and planetary gears on said carrier and meshing with said ring gear and said sun gear.

3. The vehicle wheel lock control differential of claim 1 in which said input member includes a differential ring gear and a pinion axle driven by said ring gear and pinion gears rotatably mounted on said pinion axle,
   each of said intermediate members includes
      a planetary gear set having a ring gear driven by said input member and a sun gear and a planetary carrier connected to one of said output members and planetary gears mounted thereon and meshing with said planetary ring gear,
   said sun gear and said pinion axle having said locking means associated therewith and operatively locking them together for concurrent and unitary rotation when the locking means is locked and unlocking them for independent rotation when the locking means is unlocked.

4. The vehicle wheel lock control differential of claim 1, each of said intermediate members comprising
   a differential side gear driven by said input member,
   a planetary gear set composed of an internal ring gear on said differential side gear and a sun gear and a carrier drivingly connected to one of said output members and planetary gears rotatably mounted on said carrier and meshing with said internal ring gear and said sun gear,
   said braking means including a disc on each of said differential side gears and a brake caliper assembly for braking each disc.

5. In a differential having pinion drive gears mounted on a pinion axle, planetary carrier output members connected to vehicle wheels, first and second side ring gears driven by said pinion drive gears, planetary gears driven by said side ring gears and mounted on said carrier output members, and sun gears meshing with said planetary gears;
   a positive displacement pump assembly having a housing forming a part of said pinion axle and movable therewith as a pump drive member, an output shaft secured to said sun gears for rotation therewith and providing a pump driven member;
   a pump bypass passage in said housing with selectively opened and closed control valve means therein operating to hydraulically lock said pump drive member and driven member for unitary rotation when said valve means is closed and to unlock same to permit rotation of said pump driven member relative to said pump drive member when said valve means is open;
   and vehicle wheel lock sensing and control means selectively operating said control valve means to prevent wheel lock during braking.

6. A vehicle brake and wheel lock control system comprising:
   a differential including opposed side gears, pinion gears mounted on the pinion axle of a pinion axle assembly and meshing with said opposed side gears in driving relation, first and second internal ring gears respectively on said opposed side gears;
   first and second planetary carriers respectively having first and second sets of planetary gears rotatably mounted thereon respectively meshing with said first and second internal ring gears;

and first and second sun gears respectively meshing with said first and second sets of planetary gears and rotatably mounted on said pinion axle assembly;

first and second vehicle wheels respectively drivingly connected with said first and second planetary carriers;

brake means on said opposed side gears selectively actuable to brake the vehicle;

means drivingly intermediate said pinion axle and said sun gears and forming a part of said pinion axle assembly and selectively locking said sun gears for rotation with said pinion axle and unlocking said sun gears for rotation independently of rotation of said pinion axle;

means sensing a rotational characteristic reflecting wheel slip during brake application and generating an incipient wheel lock signal when excessive wheel slip occurs;

and means receiving said incipient wheel lock signal and controlling said selectively locking and unlocking means to unlock said selectively locking and unlocking means when said signal is received and to lock said selectively locking and unlocking means when said signal is not received.

7. The system of claim 6 in which said differential is a power transmitting differential having means driving said pinion axle to transmit power to said vehicle wheels.

8. The system of claim 6 in which said selectively locking and unlocking means is a hydraulic fluid pump.

9. The system of claim 8 in which said hydraulic fluid pump has a drive input driven by movement of said pinion axle, driven output means drivingly connected with said sun gears, a hydraulic fluid return passage connecting the pump fluid input and output to return hydraulic fluid from the pump fluid output to the pump fluid input, and valve means in said passage selectively closed and opened to respectively hydraulically lock and unlock said pump drive input and driven output means, said controlling means controlling the opening and closing of said valve means.

* * * * *

UNITED STATES PATENT OFFICE
CERTIFICATE OF CORRECTION

Patent No. __3,690,426__   Dated __September 12, 1972__

Inventor(s) __Thomas W. Weisgerber__

It is certified that error appears in the above-identified patent and that said Letters Patent are hereby corrected as shown below:

Column 1, lines 64, 65 and 66, the sentence "Pinion axle 50 carries two drive the two side gears 52 and 54 which in turn drive 56 and 58." should read  -- Pinion axle 50 carries two pinion gears 52 and 54 which in turn drive the two side gears 56 and 58. --

Signed and sealed this 20th day of February 1973.

(SEAL)
Attest:

EDWARD M. FLETCHER, JR.
Attesting Officer

ROBERT GOTTSCHALK
Commissioner of Patents